US006321649B1

United States Patent
Vangen et al.

(10) Patent No.: US 6,321,649 B1
(45) Date of Patent: Nov. 27, 2001

(54) COMPACT DISC LABEL PRINTER WITH ROTATABLE PICKER ARM

(75) Inventors: William L. Vangen, Minneapolis; John Byrne, Rosemount, both of MN (US)

(73) Assignee: Rimage Corporation, Minneapolis, MN (US)

( * ) Notice: Subject to any disclaimer, the term of this patent is extended or adjusted under 35 U.S.C. 154(b) by 0 days.

(21) Appl. No.: 09/439,229

(22) Filed: Nov. 12, 1999

(51) Int. Cl.⁷ ................................................ B41F 17/00
(52) U.S. Cl. ................ 101/35; 101/4; 206/307; 206/308.1; 369/34
(58) Field of Search ............... 101/35, 4; 206/307, 206/307.1, 308.1, 309; 369/28, 29, 30, 31, 32, 33, 34, 35, 36, 37, 38, 39, 40, 41, 42

(56) References Cited

U.S. PATENT DOCUMENTS 5,734,629 * 3/1998 Lee et al. ............................. 369/34
5,914,918 * 6/1999 Lee et al. ............................. 369/34
5,946,216    8/1999 Hollerich ........................ 364/478.11
6,111,847 * 8/2000 Assadian ........................... 369/36 X
6,141,298 * 10/2000 Miller ................................. 369/30

* cited by examiner

Primary Examiner—John S. Hilten
Assistant Examiner—Minh H. Chau
(74) Attorney, Agent, or Firm—Fogg, Slifer & Polglaze, P.A.; Russell D. Slifer

(57) ABSTRACT

A compact disc handler includes a picker elevator containing a helically threaded lead screw journaled for rotation about a vertical axis and having a traveling nut thereon to which a disc picker arm is attached. A guideway in the tower cooperates with the picker arm to constrain the picker arm from rotating until reaching a predetermined height elevator. Using this design, a CD can be retrieved from an input hopper, placed in a label printer or other CD publishing/playing device and upon completion of same operation on the disc, it is transported by rotation to an output hopper.

17 Claims, 2 Drawing Sheets

COMPACT DISC LABEL PRINTER WITH ROTATABLE PICKER ARM

BACKGROUND OF THE INVENTION

I. Field of the Invention

The present invention relates generally to a compact disc handler, and more particulaautomatically transferring a blank compact disc from a supply hopper into a label printer and thereafter transferring the labeled compact disc to an output hopper.

II. Discussion of the Prior Art

Compact discs are frequently used to record high quality audio and video information. Such discs are also used to record information, including computer software and data of various types. The discs are characterized by a construction which is formed of a plurality of layers, including a reflective inner layer and a protective top layer upon which characters and graphics can be printed using an appropriate printing mechanism. Such discs are commonly referred to as CD's or DVD's.

There currently exists a number of devices for labeling compact discs and for recording information on them. Typically, such equipment is very expensive, consumes much space and is designed for mass production of compact discs. Factories incorporating such equipment generally have separate work stations and utilize a variety of methods for loading and unloading the discs with respect to the individual work stations and for transferring the discs from work station to work station.

As is further pointed out in a U.S. Pat. No. 5,946,216 to Hollerich, the prior art apparatus for picking and placing compact discs have serious drawbacks. While the mechanism described in the Hollerich '216 patent constitutes an improvement over the then prior art, the present invention constitutes yet a further improvement in disc handling equipment that obviates a need for translating the input hopper and output hopper relative to a path of linear vertical travel of a picker arm. This typically required separate motors for the elevator mechanism and for the input and output hopper translating mechanism. The present invention does away with the need for multiple motors and, accordingly, results in a significantly lower priced CD publishing/labeling machine.

SUMMARY OF THE INVENTION

In accordance with the present invention, there is provided a compact disc handler for use in compact disc publishing systems where the handler comprises a base member that is adapted to rest on a horizontal surface. A tower is affixed to the base and projects vertically therefrom. Journaled for rotation about a vertical axis within the tower is a helically threaded lead screw having a traveling nut disposed thereon and which is adapted to move in a vertical direction determined by the direction in which the lead screw is driven. Affixed to the traveling nut and extending laterally therefrom is a compact disc picker arm, including solenoid-operated disc grasping fingers that cooperate with the central aperture in CDS and which are movable between a first gripping position and a second non-gripping position. Further in accordance with the invention, means are disposed within the tower for allowing rotation of the picker arm with the lead screw only when the traveling nut reaches a predetermined vertical elevation on the lead screw.

Because of the ability of the picker arm to not only move up and down vertically but also to rotate when at a certain level of elevation, the input and output hoppers can be stationary and are located beneath the path of rotation of the gripping fingers on the picker arm.

The lead screw is adapted to be driven by a stepper motor that is controlled by a microprocessor-based controller. As such, the position of the picker arm along the lead screw relative to a predetermined home position is known at all times. Thus, the compact disc handler of the present invention is capable of first selecting a blank CD from an input hopper, elevating it to a location above the slide drawer of a label printer, releasing the blank into the slide drawer when extended, again picking the labeled CD from the extended slide drawer upon completion of the labeling operation and transferring the labeled CD into a stationary output hopper by rotating the picker arm carrying the disc through a predetermined angle.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

Figure 1:
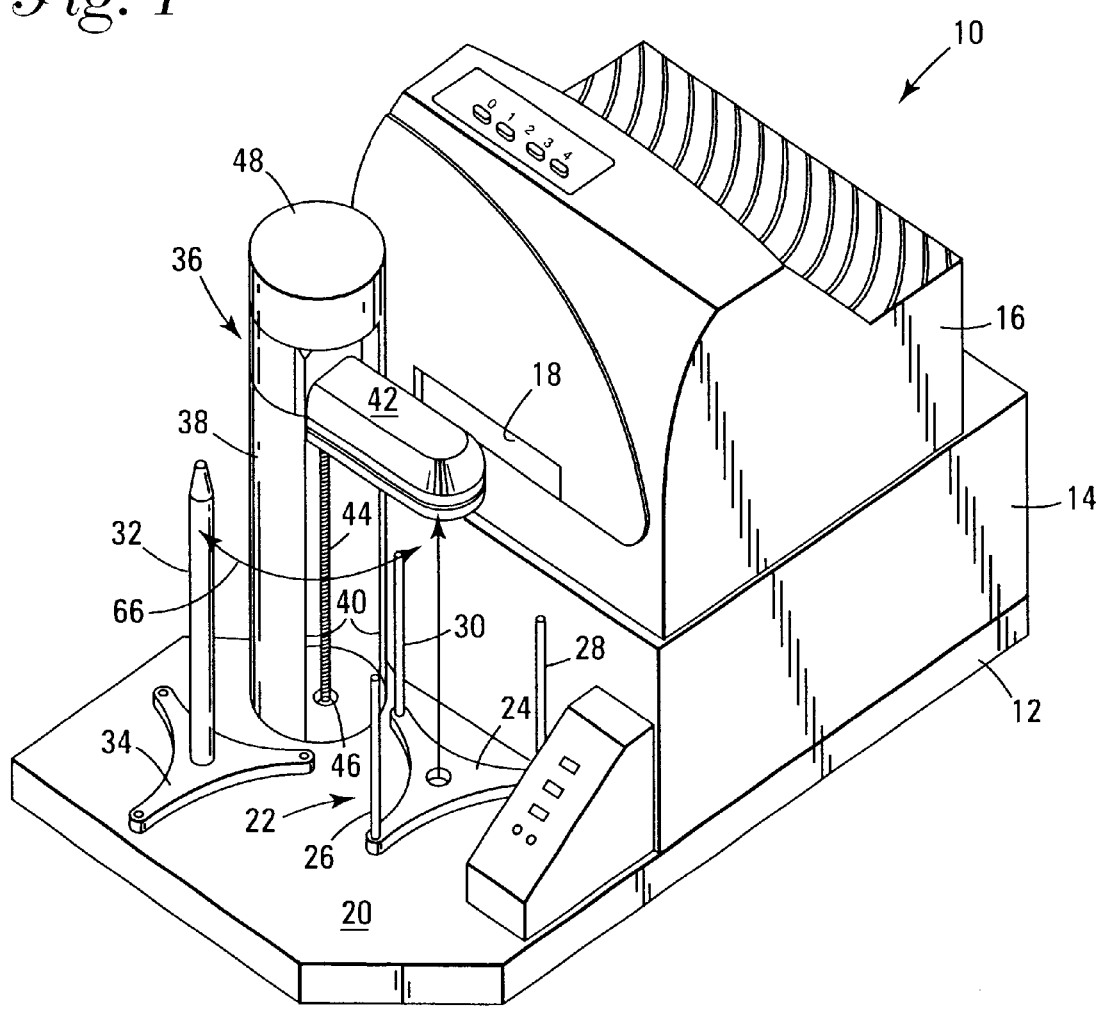
FIG. 1 a perspective view of a CD label printing machine incorporating the present invention.
Figure 2:
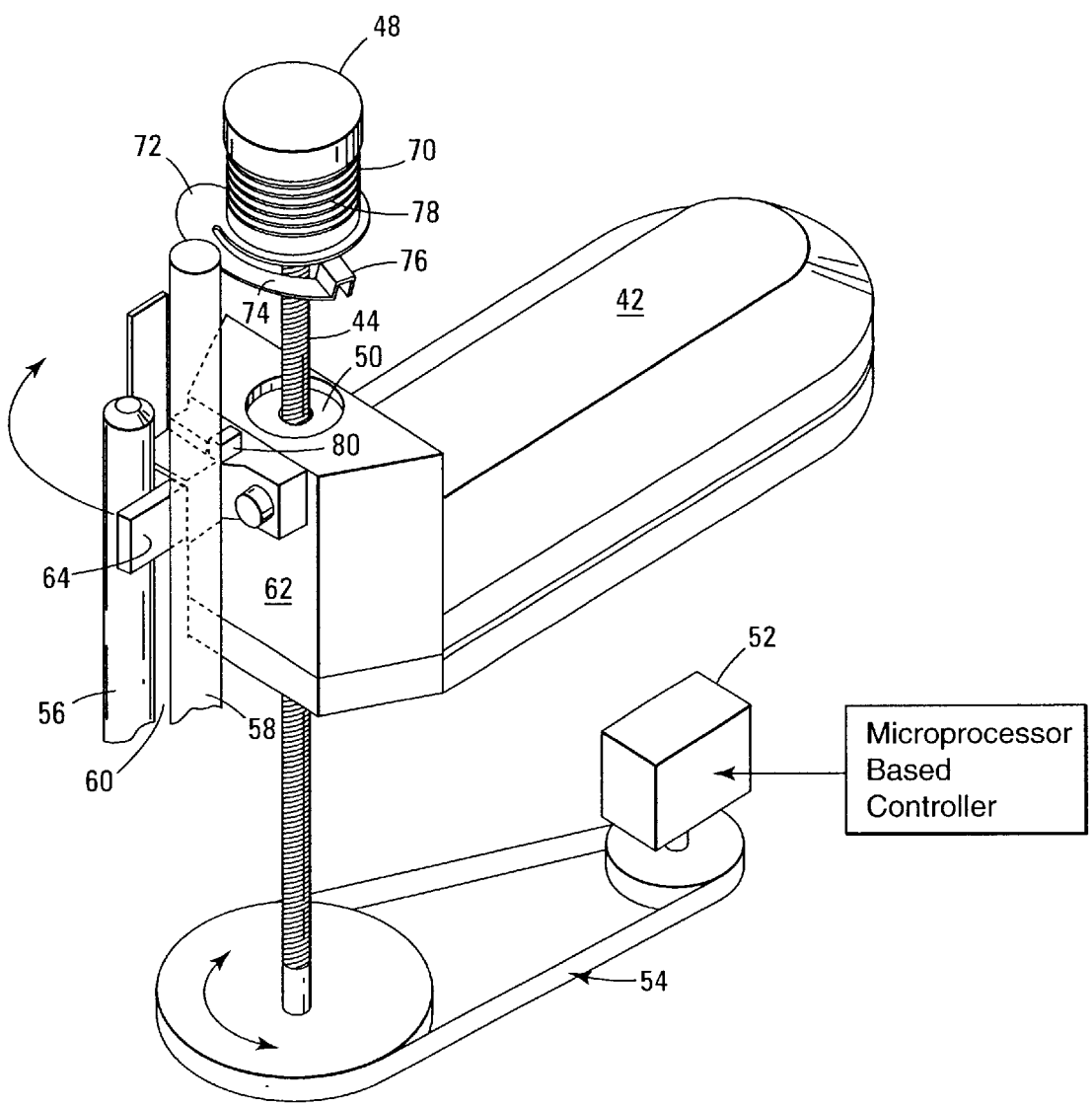
FIG. 2 partial perspective view of the elevator mechanism employed in the machine of FIG. 1.

Applicant notes that the detailed description describes FIGS. 1 and 2. As such, reference to FIGS. 3 and 4 have been removed from the description of the drawings.

DESCRIPTION OF THE PREFERRED EMBODIMENT

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Such terminology is intended to include the words above specifically mentioned, derivatives thereof and words of similar import.

Referring first to FIG. 1, there is indicated generally by 10 a CD label printing machine constructed in accordance with the present invention. It is seen to include a base member 12 supporting a box-like stand 14 thereon and resting atop the stand 14 is a commercially available CD label printing machine 16. Without limitation, the label printer 16 may be of the type manufactured and sold by Primera Technology Inc. It includes a slide drawer 18, that under microprocessor control, can be made to slide open to receive a CD thereon and then close to carry the CD to the label printing station. Slide drawers of the type described are found on a variety of devices, including PC's, CD players, etc.

Shown resting on the upper surface 20 of the base 12 is a blank disc input hopper 22 comprising a hopper base member 24 with three spaced-apart posts 26, 28 and 30 projecting vertically therefrom. The spacing is such that standard sized CD's, when lowered from above, will be constrained against lateral movement.

Also located on the upper surface 20 of the base 12 is an output hopper which may comprise a spindle 32 that projects upwardly from a base member 34. The positioning of the output spindle 32 relative to the input hopper 22 is such that the vertical center line of each is located on a common circular radius for reasons which will become apparent as the description of the invention continues.

Also mounted on the base 12 and projecting vertically from its upper surface 20 is a picker elevator assembly 36. It comprises a generally cylindrical tower 38 having a vertical slot 40 formed therein through which a CD picker arm 42 projects. Through the slot can be seen a helically threaded lead screw 44. The lead screw is journaled for rotation in a bearing 46 disposed in the base 12 and in a similar bearing (not shown) disposed in an end cap 48 of the elevator tower 38.

Referring next to FIG. 2, details of the picker elevator 36 will next be described. Threaded onto the helical lead screw 44 is a traveling nut 50 to which the picker arm 42 is attached. The lead screw 44 is adapted to be driven by a digital stepper motor 52, via a belt and pulley coupling arrangement 54. The stepper motor 52 may be located within the box-like stand 14 with the belt and pulley arrangement 54 within the base 12. The motor 52 can rotate the lead screw in either the clockwise or counter-clockwise direction under control of a microprocessor-based motor drive control circuit (not shown).

Contained within the cylindrical housing 38 of the picker elevator 36 are first and second closely spaced, vertically extending guide rods as at 56 and 58 that define a guideway 60 therebetween. The guide rods are of unequal length with the guide rod 56 ending at a predetermined height elevation below the upper end of guide rod 58. Affixed to the picker arm 42 and projecting horizontally from an inner end 62 thereof is a keeper arm member 64. So long as the keeper arm 64 is constrained in the guideway 60 between the guide rods 56 and 58, the picker arm 42 can only be translated vertically up and down.

When the keeper arm 64 reaches the predetermined height elevation defined by the upper end of the shorter guide rod 56, the keeper arm is no longer constrained and it allows the picker arm 42 to rotate in a horizontal plane about the axis of the lead screw 44 as indicated by the double-headed arrow 66 (FIG. 1).

To impart a rotational torque to the picker arm 42, there is affixed to the top of the lead screw 44 the circular top plate 48 and disposed beneath it is a spool 70 having a flange 72 at the lower end thereof. The flange is cut or notched to define an arm segment 74 terminating in an inverted U-shaped clasp 76. A coil spring 78 is wrapped about the spool 70 with one end of the spring being fastened to the upper circular cap 48 and the other end of the spring being fixed to the spool 70. The clasp 76 is adapted to engage a clasp block 80 that projects upwardly from the picker arm proximate its inner end 62 when the keeper arm 64 begins to clear the upper end of the guide rod 56.

Now, as the stepper motor 52 continues to rotate the lead screw 44, the upper cap 48 rotates with it to thereby tension the spring 78 and carry the clasp 76 engaging the clasp block 80 until the picker arm 42 swings to its drop location for depositing a disc onto the output spindle 32. Once the disc is released from the picker arm, the microprocessor reverses the direction of rotation of the lead screw causing the picker arm to again swing back until its keeper arm 64 abuts the taller of the guide rods 58 at the predetermined elevation above the top of the shorter guide rod 56. As the lead screw keeps rotating, the picker arm begins to descend and a point is reached wherein the clasp block 80 is no longer engaged by the clasp 76. At this point, the tension in the spring 78 rotates the clasp back to its home position.

The grasping fingers on the picker arm are not shown in the drawings, but they are preferably constructed and made to operate in the same fashion as the grasping fingers disclosed in the afore-referenced Hollerich '216 patent, the contents of which are hereby incorporated by reference as if set forth in full herein.

OPERATION

Referring to FIG. 1, when beginning a CD labeling operation, a stack of approximately 80 discs may be loaded into the input hopper 22 and then the input hopper is positioned onto the upper surface 20 of the base 12. Upon energization of the stepper motor 52 by the microprocessor-based motor driver, the picker arm 42 is first made to descend onto the topmost disc in the input hopper. Upon sensing the presence of a disc in the hopper, a solenoid is energized to compress the grasping fingers together so that they may enter the central aperture of the disc in the manner described in the Hollerich patent. An optical sensor controls the solenoid, causing it to be de-energized such that the grasping fingers extend to grip the edges defining the central aperture in the CD. The drive motor 52 will then reverse, causing the picker arm to be elevated to a height that is above the elevation of the slide drawer 18 of the printer module 16. The slide drawer 18 then extends and when the grasping finger solenoid is again energized, the disc will drop into the drawer and the drawer will retract into the printer module 16 where a predetermined label is applied to the theretofore blank disc.

Upon completion of the printing operation, the drawer 18 will again extend and the picker arm 42 will be made to move downward until the disc is sensed at which point the gripper fingers again grasp the finished CD. Once grasped, the rotation of the lead screw is again reversed causing the picker arm to rise. When the picker arm reaches a predetermined height elevation at which the keeper arm 64 is above the top of the shorter guide rod 56, the clasp block 80 becomes engaged in the clasp 76. Continued rotation of the lead screw begins to tighten the spring 78 and ultimately to swing the picker arm 42 carrying the disc with it to a location where the central aperture in the disc becomes aligned with the spindle 32 of the output hopper. At this point, the picker arm solenoid is again actuated causing the grasping fingers to release the CD whereupon it falls onto the base 34 of the output hopper.

With the release of the finished CD onto the output spindle, the stepper motor 52 again reverses direction with the engagement of the clasp 76 with the clasp block 80 carrying the picker arm back to the point where the keeper arm 64 strikes the upper end portion of the longer guide rod 58. This prevents further rotation of the picker arm and it begins to descend. As the keeper arm 64 enters the guide slot 60 between the parallel guide rods 56 and 58, the clasp block 80 disengages from the clasp 76 and now the tension stored in the spring 78 returns the spool 70 so that its clasp 76 is at a home position. At this point, the picker arm 42 is again above the input hopper ready to engage the topmost disc in the hopper and repeat the foregoing cycle of operation. When a point is reached when there is no longer any blank discs in the input hopper, the optical sensor in the picker arm 42 detects that condition and operation is ceased.

In the afore-referenced Hollerich '216 patent, the input and output hoppers had to be transported on a drawer and translated back and forth relative to a picker arm that could only be translated vertically and not rotated. The need for a hopper transporter and mechanics, along with a separate motor for driving same is obviated in the present design by providing a picker elevator that allows the picker arm to not only move up and down vertically, but also to rotate in a horizontal plane upon reaching a predetermined height elevation. This allows the disc to be positioned over a stationary output hopper.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A compact disc handler comprising:
   a base member adapted to rest on a horizontal surface;
   a tower affixed to the base and projecting vertically therefrom;
   a lead screw journaled for rotation within the tower along a vertical axis;
   a motor for selectively rotating the lead screw in either a clockwise or counter-clockwise direction;
   a traveling nut disposed on the lead screw and adapted to move in a vertical direction determined by a direction of rotation of the lead screw, the traveling nut having a laterally extending disc picker arm thereon;
   a guide keeper attached to the picker arm; and
   a vertical guide disposed within the tower to engage the guide keeper, wherein the motor rotates the picker arm when the guide keeper reaches a predetermined vertical elevation and disengages the vertical guide.

2. The compact disc handler of claim 1 and further including a compact disc input hopper and a compact disc output hopper disposed on the base member beneath a path of rotation of the disc picker arm.

3. The compact disc handler of claim 2 wherein a height dimension of the input hopper and the output hopper is less than said predetermined vertical elevation.

4. The compact disc handler of claim 3 and further including a compact disc label printer affixed to the base member, the label printer including a slide drawer adapted to be extended laterally at an elevation intermediate the height dimension of the input hopper and said predetermined vertical elevation.

5. The compact disc handler as in claim 1 further including a microprocessor for controlling the motor.

6. A compact disc handler comprising:
   a base member adapted to rest on a horizontal surface;
   a tower affixed to the base and projecting vertically therefrom;
   a lead screw journaled for rotation within said tower along a vertical axis;
   means for selectively rotating the lead screw in either a clockwise or counter-clockwise direction,
   a traveling nut disposed on the lead screw and adapted to move in a vertical direction determined by a direction of rotation of the lead screw, the traveling nut having a laterally extending disc picker arm thereon; and
   means disposed within the tower for allowing rotation of the picker arm with the lead screw only when the traveling nut reaches a predetermined vertical elevation on the lead screw, and comprising
   a vertically oriented guideway in the tower adapted to cooperate with the picker arm, the guideway terminating at an upper end at said predetermined vertical elevation.

7. The compact disc handler as in claim 6 wherein the guideway comprises a space between a pair of parallel, vertically oriented posts affixed at one end to the base member, one of the posts terminating at said predetermined vertical elevation with the other of the posts extending therebeyond and the picker arm includes a projection adapted to fit into said space.

8. A compact disc handler comprising:
   a base member adapted to rest on a horizontal surface;
   a tower affixed to the base and projecting vertically therefrom;
   a lead screw journaled for rotation within said tower along a vertical axis;
   means for selectively rotating the lead screw in either a clockwise or counter-clockwise direction;
   a traveling nut disposed on the lead screw and adapted to move in a vertical direction determined by a direction of rotation of the lead screw, the traveling nut having a laterally extending disc picker arm thereon; and means disposed within the tower for allowing rotation of the picker arm with the lead screw only when the traveling nut reaches a predetermined vertical elevation on the lead screw, and comprising means affixed to an upper end portion of the lead screw for releasably latching the picker arm to the lead screw for effecting rotation of the picker arm upon the traveling nut reaching the predetermined vertical elevation.

9. The compact disc handler as in claim 8 wherein the means affixed to the upper end portion of the lead screw comprises a clasp coupled through a coil spring to the lead screw, the clasp adapted to engage a projection on the picker arm upon the picker arm reaching the predetermined elevation whereby continued rotation of the lead screw rotates the picker arm.

10. A compact disc handler comprising:
    a picker arm to engage a compact disk;
    a vertically extending lead screw attached to the picker arm;
    a motor coupled to the lead screw to rotate the lead screw;
    a vertical guide located adjacent the lead screw to engage the picker arm and prevent horizontal movement of the picker arm, the vertical guide has a vertical height that is less than a vertical height of the lead screw such that the picker arm can disengage the vertical guide.

11. The compact disc handler of claim 10 further comprising a rotation clamp attached to the lead screw, the rotation clamp is adapted to engage the picker arm when the picker arm disengages the vertical guide and rotate the picker arm through a horizontal arc in response to a rotation of the lead screw.

12. The compact disc handler of claim 11 wherein the rotation clamp includes a groove to engage a pin located on the picker arm.

13. The compact disc handler of claim 12 wherein the groove is located in a vertically deflectable arm of the rotation clamp.

14. A method of operating a compact disc handler comprising:
    grasping a compact disc with a picker arm;
    rotating a vertically extending lead screw coupled to the picker arm to vertically elevate the picker arm;

preventing horizontal rotation of the picker arm engaged to a vertical guide;

disengaging the picker arm from the vertical guide;

clamping the picker arm to the picker arm to the lead screw; and rotating the lead screw and clamped picker arm about a vertical axis.

15. The method of claim 14 wherein the lead screw and picker arm are rotated using a common motor.

16. The method of claim 14 wherein the vertical guide comprises a pair of vertically extending rods laterally spaced apart, and the picker arm comprises a keeper pin horizontally extending to engage a space between the rods.

17. The method of claim 16 wherein a first rod of the pair of vertically extending rods has a vertical height that is less than a vertical height of a second rod of the pair of vertically extending rods.

* * * * *